Nov. 17, 1925.
J. C. KELSCH
1,562,337
REAR SHIELD WITH AUTOMATIC WINDSCREEN
Filed Sept. 16, 1924
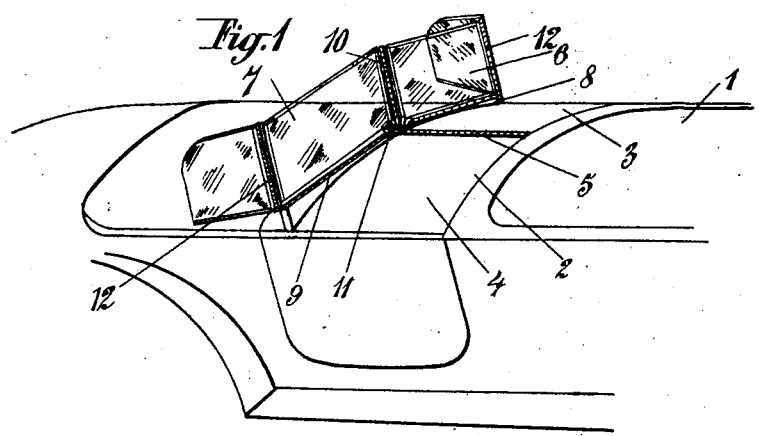
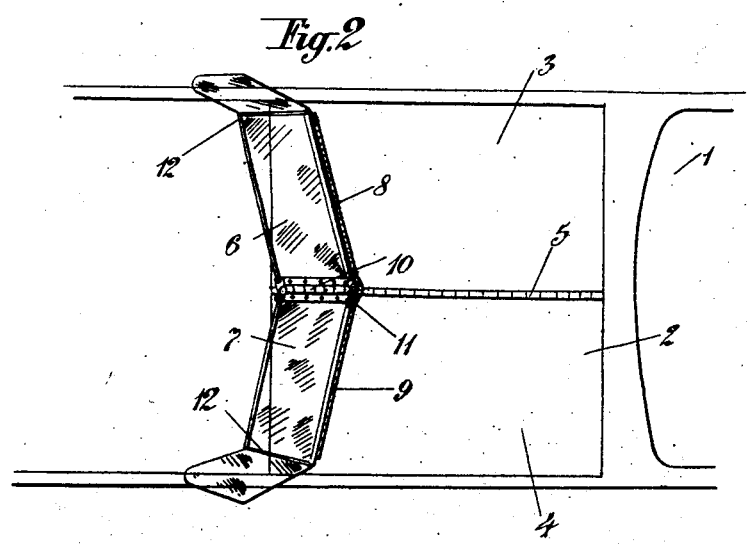
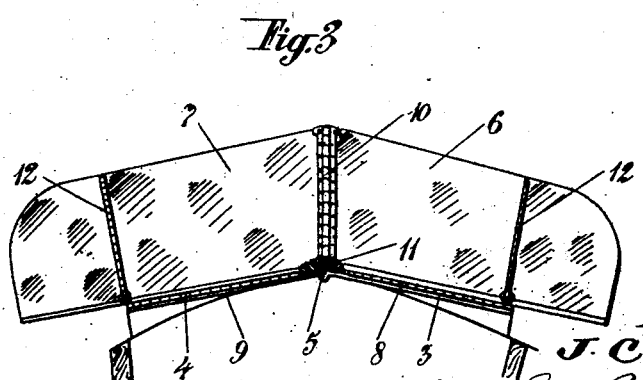
Inventor
J. C. Kelsch
By ⟨signature⟩ Atty Patented Nov. 17, 1925.

1,562,337

UNITED STATES PATENT OFFICE.

JEAN CLEMENT KELSCH, OF LEVALLOIS-PERRET, FRANCE.

REAR SHIELD WITH AUTOMATIC WINDSCREEN.

Application filed September 16, 1924. Serial No. 738,095.

*To all whom it may concern:*

Be it known that I, JEAN CLÉMENT KELSCH, citizen of the Republic of France, and resident of Levallois Perret, France, have invented certain new and useful Improvements in Rear Shields with Automatic Wind Screens, of which the following is a specification.

This invention has reference to windscreens for motor vehicles, and more especially to rear wind-screens for motor cars of the "torpedo-body" and like types.

The protection against wind without alteration of the visibility of the passengers occupying the rear seats of motor vehicles, notably of that returning in the "torpedo-body" type, has given rise to numerous fixed and detachably mounted arrangements.

The necessity to displace the protecting wind-screen in order to disengage the rear door of the vehicle is a cause of inconvenience to the passing in and out of the occupants, and obligated down to the present, in all known arrangements, successive manoeuvres of the wind-screen, which also complicates the construction and arrangement.

The object of the present invention is to provide a wind-screen distorted automatically from its normal form by a simple, easy rotation of the shield on which it is fixed thereby remedying in consequence all the above mentioned inconveniences.

In its essentials the invention consists of a shield disposed substanially horizontal on the sides of the motor vehicle body, thus protecting the legs of the occupants. The said shield is constituted of two portions connected by intermediate hinges, or connections performing the same function, each of the said parts receiving likewise by hinge means a wind-screen composed of window panes or sections, the two wind-screens being themselves connected by hinge means, or equivalent connection, along their common edge.

The flexible whole of these hinges or connections thus constituted may be compared with the four faces of a polyhedron having a common vertex remaining fixed, the dihedrons formed by and between the faces being, on the contrary, variable. In the particular case which forms the object of the invention it is sufficient to raise one of the sides of the shield the required distance in order to enter the vehicle easily, this elevation distorting the above mentioned whole which retakes its normal position when the shield has been lowered. It will be understood that such an arrangement obviates all the auxiliary stages of opening and closing and all preliminary manoeuvring of one of the elements of the wind-screen.

One constructional embodiment of the wind-screen forming the object of the present invention is shown, by way of example, in the annexed drawing, wherein:—

Fig. 1 shows a rear portion of the motor vehicle body of the "torpedo" type provided with the wind-screen according to the invention.

Fig. 2 is a plan view of the said windscreen, and

Fig. 3 is a view taken from the front of the vehicle.

Behind the back of the driver's seat 1 a shield 2 is disposed. This shield is composed of two portions 3 and 4 connected by an intermediate hinge 5, the raising of one of the panels 3, 4 permitting entrance into the vehicle from the corresponding side.

Each panel receives a wind-screen; the latter designated by the numerals 6 and 7, being capable of being placed vertically or disposed at a slight angle to each other to enable the screen to turn aside or cut through the wind more easily, or in any other appropriate manner. Each of the two wind-screens is connected by hinge means 8 and 9 to the corresponding panel, and each is joined to the other by a hinge 10. The arrangement of the whole is such that the axes of the four hinges 5, 8, 9, and 10 meet in one point 11. It is quite evident that from the constructive point of view the point 11 may be only nominal, and it may be necessary in realizing the invention to provide around this point a free zone through which the air would pass. This free zone is plugged by a joint of caoutchouc or any other appropriate arrangement. When the panels of the shield are curved, which is generally the case, the hinges such as 8 and 9 are conveniently mounted on a transverse member such as that shown.

The shield is maintained on the motor vehicle body 1 in any manner whatsoever, as for example by a hinge 5 mounted on the motor vehicle body, and, the extremities of each of its panels resting on the sides of the body of the motor vehicle, the occupants have their legs protected against wind and inclement weather.

It may be necessary sometimes to prevent any turning back of each of the wind-screens under the action of the wind which would entail rupture thereto. To this end posts 12 are optionally introduced. These posts which can pivot for example on their base along with the wind-screen in an arc bounded by the shield 12, would sustain the panes or sections of the wind-screens. Upon these posts, movable screens or side sections can be mounted by hinge means.

It remains to be equally understood that the invention is not rigorously limited to the arrangements described which are only given, by way of example, and can vary in form, dimensions, material and details of construction and such like.

Having now particularly described and ascertained the nature of my said invention, and in what manner the same is to be performed, I declare that what I claim is:—

1. A rear shield for motor vehicles, including horizontally disposed panels adapted for independent movement, wind screens carried by and projecting above the panels, and connections between the wind screens and panels to permit the wind screens to automatically fold in the opening movement of the panels.

2. A rear shield for vehicles, comprising panels hingedly connected together at their inner edges and movably connected to a fixture of the vehicle, and wind screens hingedly connected to the panels and to each other, the arrangement of the hinged connections permitting the wind screens to automatically fold in the opening movement of either of the panels.

3. A rear shield for vehicles, comprising horizontally disposed panels movably mounted at their inner edges, whereby to permit a swinging movement of either panel, and a wind screen movably mounted on each panel, the inner edges of the wind screens being movably connected together, the mounting of the connections between the wind screens and between the wind screens and panels permitting the wind screens to automatically fold with respect to the panels and to each other in the opening movement of either panel.

4. A rear shield for vehicles, comprising horizontally disposed panels movably mounted at their inner edges, whereby to permit a swinging movement of either panel, and a wind screen movably mounted on each panel, the inner edges of the wind screens being movably connected together, the mounting of the connections between the wind screens and between the wind screens and panels permitting the wind screens to automatically fold with respect to the panels and to each other in the opening movement of either panel, the return of the panel to normal position serving to automatically restore the wind screens to operative positions.

5. A rear shield for motor vehicles, comprising horizontally disposed panels, a hinged joint connecting the adjacent ends of said panels, a wind screen arranged above each panel, a hinged connection between said wind screen and panel, and a hinged connection between the adjacent edges of the wind screens, all of said hinged connections leading to a common center, whereby on raising one of the panels the wind screens are automatically folded upon their hinged connections with each other and with the panels.

JEAN CLEMENT KELSCH.